United States Patent
Mizrahi

(10) Patent No.: US 11,275,698 B2
(45) Date of Patent: Mar. 15, 2022

(54) TERMINATION OF NON-VOLATILE MEMORY NETWORKING MESSAGES AT THE DRIVE LEVEL

(71) Applicant: Marvell Asia Pte, Ltd., Singapore (SG)

(72) Inventor: Noam Mizrahi, Modi'in (IL)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 16/817,846

(22) Filed: Mar. 13, 2020

(65) Prior Publication Data

US 2020/0293464 A1 Sep. 17, 2020

Related U.S. Application Data

(60) Provisional application No. 62/818,557, filed on Mar. 14, 2019.

(51) Int. Cl.
*G06F 13/16* (2006.01)

(52) U.S. Cl.
CPC .................. *G06F 13/1668* (2013.01)

(58) Field of Classification Search
CPC .............. G06F 13/16; G06F 13/1668
See application file for complete search history.

(56) References Cited

U.S. PATENT DOCUMENTS

| | | |
|---|---|---|
| 9,313,128 B2 | 4/2016 | Morimoto |
| 9,785,355 B2 | 10/2017 | Huang |
| 10,162,793 B1 | 12/2018 | Bshara et al. |
| 10,423,358 B1 | 9/2019 | Foo |
| 10,671,302 B1 | 6/2020 | Aggarwal et al. |
| 10,691,368 B2 | 6/2020 | Kachare et al. |
| 2005/0243818 A1 | 11/2005 | Foglar et al. |
| 2015/0006663 A1 | 1/2015 | Huang |
| 2016/0085718 A1 | 3/2016 | Huang |
| 2016/0127492 A1 | 5/2016 | Malwankar et al. |
| 2016/0210062 A1 | 7/2016 | McCambridge et al. |
| 2017/0149920 A1 | 5/2017 | Sammatshetti |

(Continued)

FOREIGN PATENT DOCUMENTS

| | | |
|---|---|---|
| WO | WO-2016/182756 | 11/2016 |
| WO | WO-2018/217316 | 11/2018 |

OTHER PUBLICATIONS

International Search Report and Written Opinion in International Patent Application No. PCT/IB2020/000414, dated Sep. 9, 2020 (10 pages).

(Continued)

*Primary Examiner* — Henry Tsai
*Assistant Examiner* — Christopher A Daley

(57) ABSTRACT

A storage device, such as a solid-state drive, is configured to receive messages, such as non-volatile memory networking messages issued by a host processor or computer, that utilize NVM Express over Fabric (NVMe-oF) or NVMe/Transmission Control Protocol communication formatting for transmitting the command over a network fabric. The storage device is configured to terminate the NVMe-oF or NVMe/TCP formatted communication at the storage drive level. The storage device may further be configured to issued reply messages that include NVMe-oF or NVMe/TCP formatting for the communication formatting used to deliver the reply messages over a network fabric.

19 Claims, 4 Drawing Sheets

(56) References Cited

U.S. PATENT DOCUMENTS

| | | | |
|---|---|---|---|
| 2017/0286363 A1 | 10/2017 | Joshua et al. | |
| 2018/0046594 A1 | 2/2018 | Worley et al. | |
| 2018/0081565 A1 | 3/2018 | Tan et al. | |
| 2018/0101450 A1 | 4/2018 | Park et al. | |
| 2018/0107591 A1 | 4/2018 | Smith | |
| 2018/0284989 A1 | 10/2018 | Kachare et al. | |
| 2018/0284990 A1* | 10/2018 | Kachare | G06F 13/4022 |
| 2018/0285019 A1 | 10/2018 | Olarig et al. | |
| 2018/0321876 A1 | 11/2018 | Ballapuram et al. | |
| 2019/0107956 A1* | 4/2019 | Kachare | G06F 13/4234 |
| 2019/0163364 A1* | 5/2019 | Gibb | G06F 3/0629 |
| 2019/0250855 A1* | 8/2019 | Kachare | G06F 3/061 |
| 2019/0272123 A1 | 9/2019 | Gissin et al. | |
| 2019/0317901 A1* | 10/2019 | Kachare | G06F 12/1009 |
| 2020/0125157 A1* | 4/2020 | Kachare | G06F 3/0634 |
| 2020/0225863 A1* | 7/2020 | Veluswamy | G06F 3/061 |
| 2020/0225874 A1* | 7/2020 | Nimmagadda | G06F 15/17331 |

OTHER PUBLICATIONS

Hoff, "Checklist for What's New in NVMe™ over Fabrics," https://nvmexpress.org/checklist-for-whats-new-in-nvme-over-fabrics, Oct. 29, 2018 (3 pages).

U.S. Appl. No. 16/820,320, Shahar Noy et al., "Ethernet Enabled Solid State Drive (SSD)," filed Mar. 16, 2020.

U.S. Appl. No. 16/820,308, Haimzon et al., "Transferring Data Between Solid State Drives (SSDs) Via a Connection Between the SSDs," filed Mar. 16, 2020.

U.S. Appl. No. 16/717,408, Noam Mizrahi, "Solid-State Drive with Initiator Mode," filed Dec. 17, 2019.

* cited by examiner

TERMINATION OF NON-VOLATILE MEMORY NETWORKING MESSAGES AT THE DRIVE LEVEL

CROSS REFERENCE TO RELATED APPLICATION

This disclosure claims the benefit of priority of U.S. Provisional Application Ser. No. 62/818,557 filed Mar. 14, 2019, entitled, "NVMe-oF TERMINATION AT THE DRIVE LEVEL" the contents of which is incorporated herein by reference in its entirety.

FIELD OF USE

This disclosure relates to the field of data storage for computer and electronic network systems, and more particularly, to termination of non-volatile memory networking messages formatted using various communication formatting between storage devices coupled to a computer or electronic network systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A solid-state drive (SSD) is a data storage device that uses non-volatile memory, such as NAND (Not-And) or NOR (Not-Or) non-volatile memory, to store persistent digitally encoded data. The SSD may be configured to emulate a hard disk drive, i.e., a device that stores persistent digitally encoded data on magnetic surfaces of rapidly rotating platters and replaces a hard disk drive (HDD) in many applications.

A host computer ("host") is typically coupled to the SSD to request and control data services provided by the SSD, such as reading data from the SSD, writing data to the SSD, and erasing data from the SSD. The host may be coupled to the SSD through a network fabric, which may include one or more intermediary devices, such as one or more interface switches and/or routers, coupled through wired and/or wireless interconnections. To facilitate the data operations, the SSD may include a SSD controller, also referred to as a "local controller," which may include a SSD interface for communicating with the host computer through the network fabric, and a local processor. In some examples, the local controller may communicate directly with a host computer, wherein the host computer is then communicatively coupled to additional computer devices and/or networks, allowing communications between the SSD and these additional computer devices and/or networks.

Conventionally, the physical connection between the SSD and the local processor is a hardwired connection, and communications between the SSD and the local processor may be performed using Peripheral Component Interconnect Express (PCI Express or PCIe) as the transport layer and NVM Express (NVMe) as the protocol layer for formatting the communications between these devices. When an interface switch is included, this same PCI Express/NVMe communication format may be used to provide communications between the local processor and the interface switch.

Communications between the host computer and the interface switch may be provided over a networking fabric, such as ethernet, Fiber Channel, or InfiniBand. The communications between the host computer and the interface switch may utilize NVMe over Fabric (NVMe-oF) as the protocol layer. The transport layer for these communications may utilize ethernet or Remote Direct Memory Access (RDMA).

SUMMARY

This disclosure relates generally to storage devices, such as but not limited to solid-state drives (SSD), which are configured to receive and terminate commands configured using NVMe-oF communications formatting.

Aspect of the disclosure are directed to a method for terminating non-volatile memory networking messages at the drive level, the method comprising receiving, at a storage device, a message requesting data storage services to be provided by the storage device, the message provided over a network interconnection having NVM Express over Fabric (NVMe-oF) communication formatting of the message. The method further comprises terminating, at the storage device, the message having NVMe-oF communication formatting as received at the storage device.

Aspect of the disclosure are directed to a method for terminating non-volatile memory networking messages at the drive level, the method comprising receiving, at a storage device, a message requesting data storage services to be provided by the storage device, the message provided over a network interconnection using NVMe/Transmission Control Protocol (NVMe/TCP) communication formatting of the message. The method further comprising terminating, at the storage device, the message having NVMe/TCP communication formatting as received at the storage device.

Aspect of the disclosure are directed to an apparatus for terminating non-volatile memory networking messages at the drive level, the apparatus comprising a storage device comprising a local processor and a memory array, wherein the memory array is configured to store persistent digitally encoded data on non-volatile memory, and wherein the local processor is configured to terminate NVM Express over Fabric (NVMe-oF) or NVMe/Transmission Control Protocol (NVMe/TCP) at the local processor that have been issued by a host processor and communicated over a network fabric.

Figure 1:
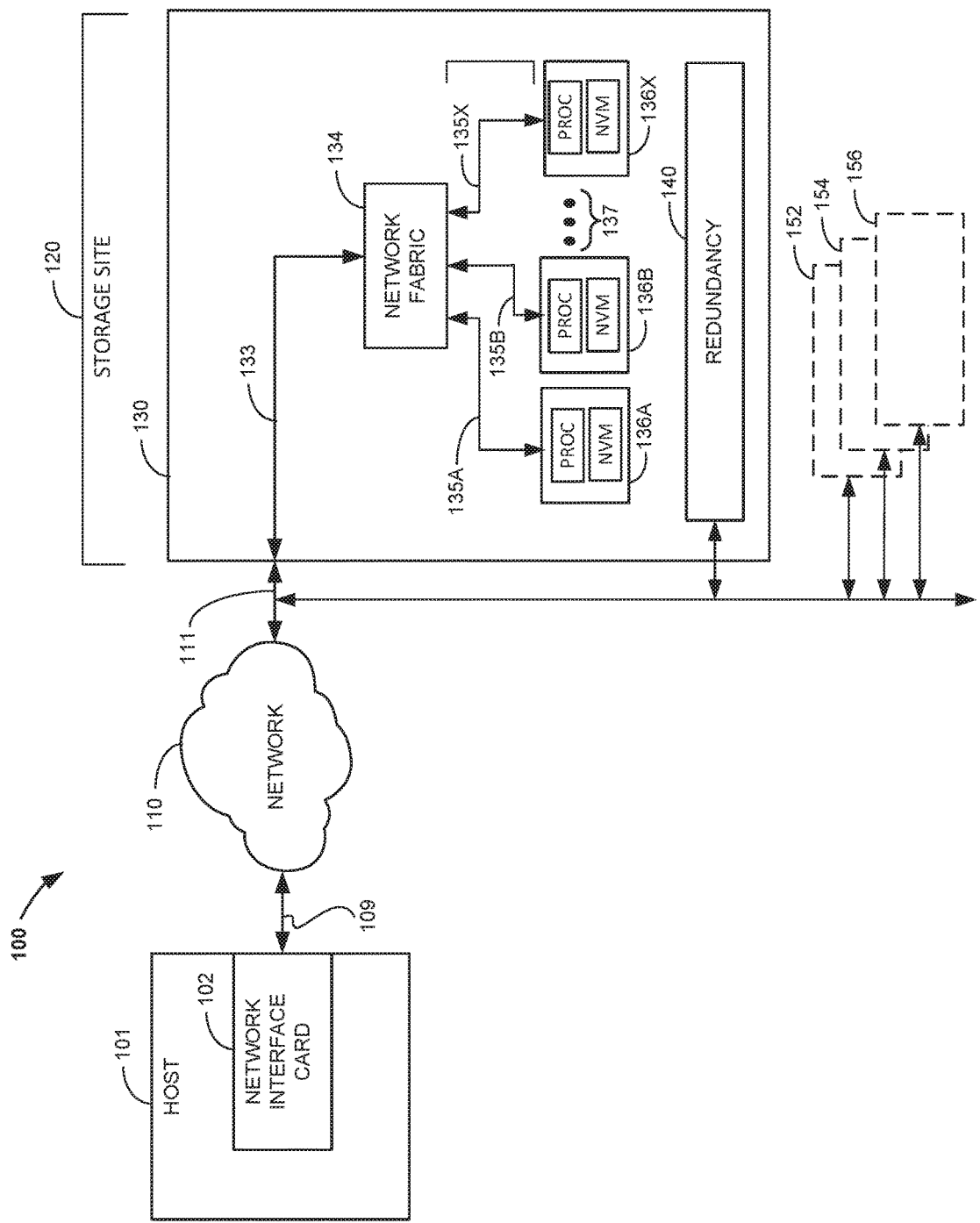
FIG. 1 illustrates an example configuration of a computer networking system including storage devices configured to terminate non-volatile memory networking messages at the storage device level.

The drawings are for the purpose of illustrating example embodiments, but it is noted that the embodiments are not limited to the arrangements and instrumentality shown in the drawings.

DETAILED DESCRIPTION

This disclosure provides examples and details related to data storage devices, such as solid-state drives (SSDs), hard-disk drives (HDDs), and/or hybrid SSD/HDD drives, which are configured to provide data storage and to receive and terminate non-volatile memory networking messages at the drive level. The non-volatile memory networking messages may include commands comprising requests issued by a host computer for data services that may be provided by the target storage device to which the communication is being directed. In addition, examples of storage devices described herein may be configured to generate and issue replies that are formatted using NVMe communications formatting, the replies transmitted over a network fabric such as ethernet to one or more other devices, such as a host processor or computer device.

NVM Express (NVMe) is a specification that defines how a host device, such as a host processor or computer, communicates with a storage device, such as a SSD, over a PCI Express compliant bus. NVMe over Fabric (NVMe-oF) is another technology specification designed to enable non-volatile memory express message-based commands to transfer data between a host device, such as a host processor or computer, and a target storage device, such as a SSD, over a network fabric, such as ethernet, Fibre Channel (FC), or InifiniBand. The addition of NVMe Transport Control Protocol (NVMe/TCP) makes possible the communication of the non-volatile memory networking messages with TCP as a transport layer for the communications.

While both NVMe and NVMe-oF have similar features, such as the use of a set of commands to control the operations of the storage devices as requested by the host device, one of the main distinctions between NVMe and NVMe-oF is the transport-mapping mechanism for sending and receiving the commands and responses being communicated between the devices. NVMe-oF uses a message-based model for communications between a host device and a target storage device, wherein local NVMe communications include mapping commands and responses to shared memory in the host over a PCIe interface protocol.

NVMe-oF enables the use of alternate transports to PCIe, wherein these alternate transports extend the distances across which a NVMe host device and NVMe storage drive or subsystem can connect. An original design goal for NVMe-oF was to add no more than 10 microseconds of latency between an NVMe host and a remote NVMe target storage device connected over an appropriate networking fabric, versus the latency of an NVMe storage device using a local server's PCIe bus. Greater storage system throughput has been enabled through use of NVMe-oF technologies. In addition, the examples of systems, apparatus, methods and techniques as described herein that terminate NVMe-oF transport at the drive (SSD/HDD) level rather than at an aggregator (such as network adaptor cards—sNIC/NIC) permits even greater storage system throughput and better drive utilization. Examples of the storage systems, apparatus, methods, and techniques described herein may no longer be capped by network adaptor bottlenecks or be dependent on compute as a method to connect a plurality of drives to a network, but instead may utilize interface devices, such as an ethernet switch, in a compute-less architecture wherein NVMe-oF formatted commands may be terminated at the drive level instead of at the intermediary device.

In addition, the NVMe/TCP standard defines the mapping of NVMe queues, NVMe-oF capsules and data delivery over the IETF Transport Control Protocol (TCP). The addition of NVMe over TCP makes possible the use NVMe-oF across a standard Ethernet network.

FIG. 1 illustrates an example configuration of a computer networking system 100 including storage devices configured to terminate non-volatile memory networking messages (hereinafter "messages"), at the storage device level. The messages may be communicated over a fabric network using NVMe-oF as the communications format, and terminated at the storage device, such as a solid-state drive. In other examples, the messages may be communicated over a fabric network using NVMe/TCP as the communications format, and terminated at the storage device, again such as a solid-state drive. As shown in FIG. 1, the computer networking system 100 (system 100) includes a host 101 coupled to network 110. The network 110 is also coupled to a data storage site, the data storage site generally indicated by bracket 120, (hereinafter "storage site 120"). Storage site 120 includes at least one backplane 130. In various examples, backplane 130 may represent a storage rack that includes one or more backplanes 130, each backplane including a plurality of storage devices, such as solid-state drives (SSDs). Each backplane may further include a network fabric coupling the SSDs included on the backplane through one or more switching devices and/or other networking devices. Host 101 is not limited to any particular type of host or device, and may include any type of host, such as a computer processor or a network of computers and processors. Host 101 is not necessarily limited to comprising a single host device, and may represent a plurality of host devices communicatively coupled through one or more network interface cards, illustratively represented by network interface card (NIC) 102. NIC 102 is coupled to network 110 through interconnect 109. Network 110 is also communicatively coupled to storage site 120 through interconnect 111. For example, network 110 is communicatively coupled to backplane 130 though interconnect 111 coupled to network fabric 134 of backplane 130. Network fabric 134 is further coupled to each of NVMe compatible storage devices 136A-136X through respective interconnects 135A-135X. In various examples, each of interconnect 133, network fabric 134, and interconnects 135A-135X are all configured to communicate using NVMe-oF or NVMe/TCP formatted commands, so that incoming messages received at interconnect 133 are passed along and are not terminated until the commands reach the one or more storage devices 136A-136X. Each of storage devices 136a-136X includes one or more processors (PROC) coupled to a non-volatile memory array (NVM). The one or more processors at each storage device is configured to terminate at the storage device any NVMe-oF and/or NVMe/TCP formatted communications received from network fabric 134.

In an illustrative non-limiting example, host 101 provides commands and/or data to NIC 102 for communication to backplane 130, wherein the commands and/or data may include data to be stored on the one or more storage devices 136A-136X, command(s) to read data stored on one or more of the storage devices 136A-136X, or other commands, such as commands to erase data stored on one or more storage device(s) 136A-136X, or other types of data housekeeping commands, such a defragmenting commands, related to the data stored in the storage devices of backplane 130. NIC 102 provides the commands and/or data using NVMe-oF as the protocol layer for transmission to backplane 130 using for example RDMA over Converged ethernet v02 as the transport layer for the communications.

The communications that are output from NIC 102 are passed through interconnect 109 to network 110, through network 110, and on through interconnect 111 to network fabric 134 at backplane 130 using the NVMe-oF protocol. The communications received at network fabric 134, are forwarded using the same communication formatting, such as NVMe-oF formatting or NVMe/TCP formatting, to one or more of NVMe storage devices 136A-136X. At one or more of the NVMe storage devices 136A-136X, the messages communicated to and through the network fabric 134 are terminated at the individual storage device(s) 136A-136X, and the operations requested by the messages are commenced by the local processors and the memory arrays included in appropriate ones of storage devices 136A-136X.

The lack of a need for a network interface card, such as an ethernet network interface card, (and in many cases one or more processors included in the network interface card) that would normally be required to couple the network to the storage devices 136A-136X reduces the overall number of devices needed to provide the communications between the host 101 and the storage device. In existing systems, the NVMe communications issued by host 101 from NIC 102 and communicated through network 110 and interconnect 111 to a network interface card located at a backplane would be terminated for example at a network interface card at the storage box or backplane 130, and then would be forwarded for example over a PCIe switch to the underneath storage.

Termination as used in this disclosure refers to a communications having a particular format, for example with respect to the transport or protocol layers of the communication, either arriving at its final target device, or arriving at an intermediary device that is not the final destination device to which the command is directed, and wherein the intermediate device receives the communication being transmitted with a first communication formatting, and reconfigures the communication with a second communication formatting that is different form the first communication formatting before forwarding the communication along to another device.

Termination in some examples refers to the ending of the use of the NVMe-oF as the protocol used to further transmit the received communication, and switching to a different protocol layer for furthering transmission of the received communication. In other examples, termination refers to ending the use of NVMe/TCP as the protocol used to further transmit the received communication, and switching over to a different communication format for furthering the transmission of the received communication. For example, in prior systems the NVMe-oF communication received at a network interface card at the storage box would be terminated, and a switch would be configured to forward the communication to one or more of storage devices 136A-136X using a different protocol, such as using PCIe at the transport layer, and NVMe as the protocol layer. Termination of the NVMe-oF communication at the network interface card requires the network interface card to include one or more processors and programming to terminate the incoming NVMe-oF communication, and to reconfigure the outgoing communication from the NIC to the storage devices 136A-136X using the different transport and protocol layers.

Examples of backplane 130 are configured so that one or more of storage devices 136A-136X are NVMe-oF compatible devices, and are capable of directly receiving and terminating communications that include NVMe-oF formatting. In other examples, the backplane 130 is configured so that one or more of storage devices 136A-136X are NVMe/TCP compatible devices, and are capable of directly receiving and terminating communications the include NVMe/TCP formatted communications. As such, the communications received at network fabric 134 does not terminate at the network fabric, and instead passes through the network fabric to one or more of storage devices 136A-136X as NVMe formatted communications. This allows for the advantages described above related to NVMe devices and communications, including increased distances over which an NVMe host device and NVMe storage devices can communication with one another, maximum accumulated bandwidth of the entire flash array as not bounded by the NIC capacity, and the reduced latency of the communications compared for example to NIC, CPU and devices requiring PCIe interface protocol and use of PCIe switches along some portion of path over with the communications must travel.

In addition to receiving commands having NVMe formatting, storage devices 136A-136X may be configured to provide reply messages directed back, for example to host 101, the reply messages having NVMe-oF or NVMe/TCP formatting configurations that are generated at the storage devices. As such, these outgoing reply messages that are issued by the storage devices 136A-136X may also be transmitted across the network, including network fabric 134, interconnect 111, network 110, and interconnect 109, without the need to terminate the reply messages until the reply messages reach the target host, for example host 101. Because these reply messages may be transmitted across the network fabric using NVMe-oF or NVMe/TCP formatting without the need to terminate the reply messages at any intermediate devices, the advantages described above for expanded distance and reduced latency for the NVMe formatted communications may be realized with respect to transmission of the reply messages.

Examples of backplane 130 may include additional features, such as redundancy block 140. Examples of redundancy block 140 may include a duplication of the circuitry including network fabric 134, and storage devices 136A-136X as described above, or any equivalent thereof. Redundancy block 140 may also be coupled to network 110 through interconnect 111, and may be configured to receive the same communications that are directed to storage devices 136A-136X. The redundant storage devices included in redundancy block 140 may also be configured as NVMe-oF or NVMe/TCP compatible devices, and configured to received and terminate at the storage devices included in block 140 the NVMe-oF or NVMe/TCP formatted commands issued by host 101 over network 110 and through interconnect 111. By being configured to receive the same NVMe-oF or NVMe/TCP commands being received by storage devices 136A-136X, redundancy block 140 may provide a duplication, and thus a back-up, for any or all of the data transactions and data operations being performed/provided by storage devices 136A-136X. Thus, redundancy block 140 provides an additional level of robustness for the data storage functions being provided by backplane 130.

Examples of system 100 are not limited to having a particular number of storage devices, such as SSDs. In various examples, system 100 may comprise as few as two SSDs, and may comprise some positive integer number "N" SSDs, as illustratively represented in FIG. 1 by the dots generally indicated by bracket 137. As a non-limiting example, data storage may include multiple individual SSDs coupled to interconnects 135A-135X in an arrangement of system 100. Each of the SSDs included in backplane 130 may be communicatively linked to network 110 through network fabric 134 and connection 133.

In addition, storage site 120 is not limited to having a particular number of storage units. As illustrated in FIG. 1, storage site 120 may include a plurality of storage backplanes, including backplanes 130, 152, 154, and 156 as shown in FIG. 1 as a non-limiting example. The additional storage units 152, 154, and 156 may include some number of NVMe-of compatible storage devices, and may be configured to perform any of the functions and to provide any of the features described above with respect to backplane 130.

Example NVMe-oF Termination at the Drive Level

In various examples, one or more storage devices, such as SSDs, are provided at a storage site or as part of a storage unit, and are configured as NVMe-oF compatible devices that are configured to terminate NVMe-oF formatted communications at the drive level. These storage devices may also be configured to generate responses in the form of reply messages. The reply messages may be transmitted from the storage device to a host device that originated commands received by the storage device, wherein the reply messages are formatted using NVMe-oF communication formatting so that the reply messages may be communicated through a network fabric from the storage device to the host device without the need to terminate the NVMe-oF formatted communication prior to the reply message arriving at the targeted host device.

Example NVMe/TCP Termination at the Drive Level

In various examples, one or more storage devices, such as SSDs, are provided at a storage site or as part of a storage unit, and are configured as NVMe compatible devices that are configured to terminate NVMe/TCP formatted communications at the drive level. For example, incoming NVMe/TCP formatted communication received at backplane 130 may be passed through network fabric 134 and to one or more of the storage devices 136A-136X using the NVMe/TPC formatting for the messages. The NVMe/TCP communication are then terminated, for example by the respective processor or processors positioned at the individual storage devices. These storage devices may also be configured to generate responses in the form of reply messages. The reply messages may be transmitted from the storage device to a host device that originated commands received by the storage device, wherein the reply messages are formatted using NVMe/TCP communication formatting so that the reply messages may be communicated through a network fabric 134 from the storage device to the host device without the need to terminate the NVMe/TCP formatted communications prior to the reply message arriving at the targeted host device.

Figure 2A:
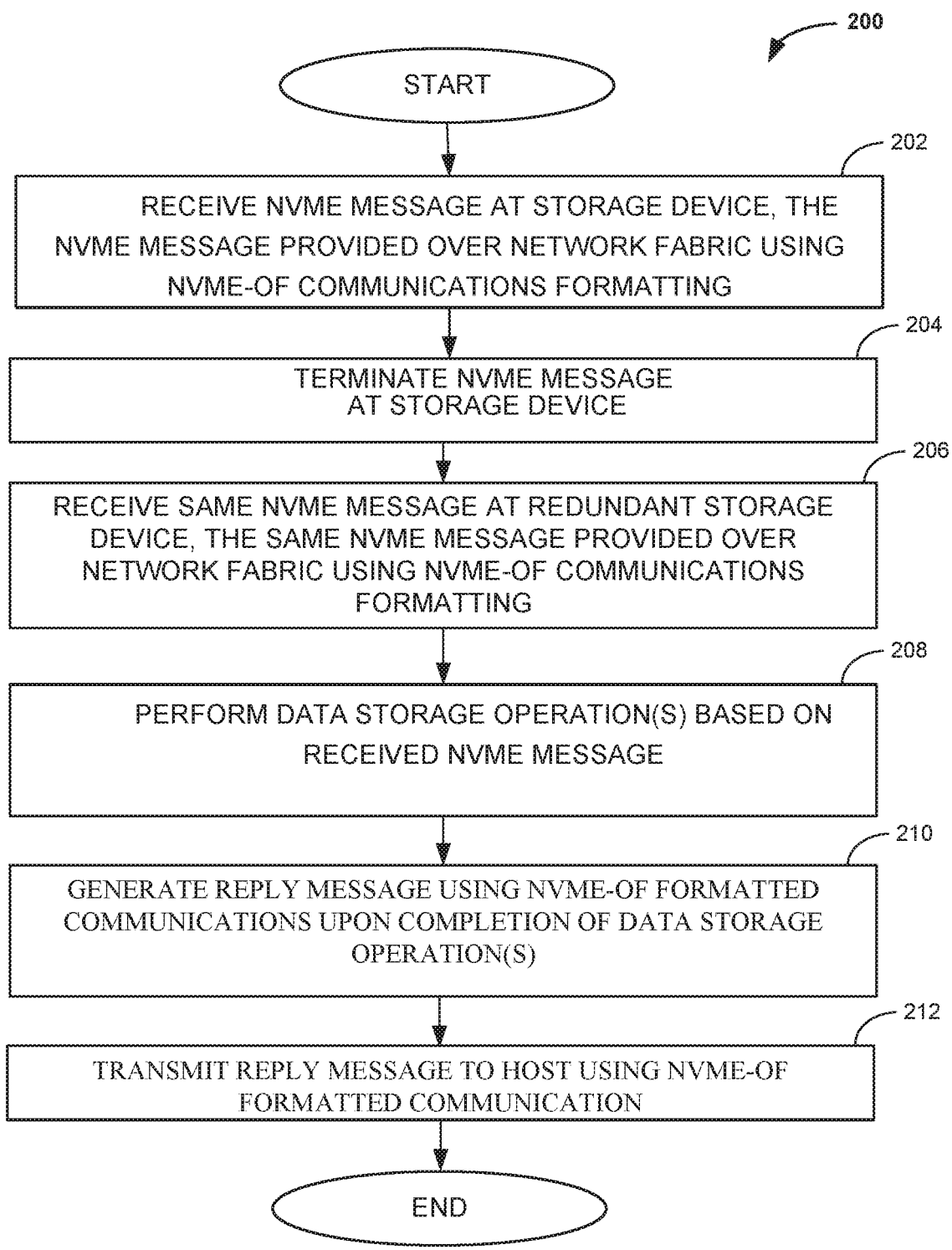
FIG. 2A is a flowchart of a method for terminating non-volatile memory networking messages at the drive level.

FIG. 2A is a flowchart of a method 200 for terminating non-volatile memory networking messages at the drive level. Method 200 comprises various functions associated one or more storage devices, such as SSDs, which are configured as NVMe-oF compatible devices and further configured to terminate at the drive level any NVMe-oF formatted messages directed to the storage devices. The storage devices may further be configured to generate and issue one or more reply messages directed to the host and regarding a status provided in response to received messages, where the reply messages may also be generated and issued using NVMe-oF formatting.

At block 202, examples of method 200 include receiving, at storage device, a NVMe message issued by a host for data storage services to be provided by the storage device, the message provided over a network fabric using NVMe-oF communication formatting. In various examples, the storage device is a solid-state drive (SSD) device. In various examples, the storage device is a hard-disc drive (HDD). In various examples, the storage device is a hybrid SSD/HDD. In various examples, the network fabric comprises ethernet devices and ethernet compatible interconnections coupling the devices of the network fabric.

At block 204, examples of method 200 include terminating the NVMe-oF formatted communication including the message at the storage device. In various examples, terminating the NVMe-oF formatted communication includes terminating the communication at a local processor of the storage device. In various examples, the local processor and a memory array of the storage device are provided on a same integrated circuitry or circuitry.

At block 206, examples of method 200 include receiving, at a redundant storage device, the NVMe message that was directed to and received by the storage device as the same message, the same message provided over the network fabric using NVMe-oF communications formatting. In various examples the redundant storage device is a solid-state drive (SSD) device. In various examples, the redundant storage device is a hard-drive device (HDD). In various example, the storage device is a hybrid SSD/HDD. In various examples, the redundant storage device is a same type of device (e.g., a SSD) as the storage device receiving the message at block 202 of method 200. In various examples, the redundant storage device is a different type of device (e.g. a SSD versus a HDD) relative to the storage device receiving the message at block 202 of method 200.

At block 208, examples of method 200 include performing one or more data storage operations based on the received message. Performing one or more data storage operations may include reading data stored in a memory array of the storage device, writing data to the memory array of the storage device, erasing data stored in the storage device, some combination of these operations, and/or other operations that relate to data stored at the storage device, and/or the operational status of the storage device. For example, a message may be received including a request to provide information related to the overall and/or the remaining data storage capacity present in the storage device, and/or a request for reporting performance information with respect to latency or other performance parameters associated with the operation of the storage device receiving the message.

Performing data storage operations in some examples may include setting memory locations or flags in a request queue of the storage device to indicate that the one or more operations requested as a result of receiving the message at the storage device have been received, and setting memory locations or flags in a completion queue of the storage device to indicate that the one or more operations requested as part of receiving the message have been completed. In various examples, one or more memory locations or flags within the storage device may be set when for any reason the operation(s) being requested by the message cannot be completed in full and/or in part (e.g., by setting one or more error codes associated with the required data storage operation associated with the message).

At block 210, examples of method 200 include generating a reply message using NVMe-oF formatted communications upon completion of the one or more data storage operations associated with the received message. In various examples, the reply message may include data that was requested to be read from the data array of the storage device that received the message. In various examples, the reply message may include information or other indications that indicate that the data storage operation(s) requested by the received message have been successfully completed. In various examples, the reply message may include information or other indications, such as flag settings, indicating that the data storage operation requested by the received message was not successfully completed. A reply message indicating unsuccessful completion of a requested data storage service may further include data, such as one or more error codes, or textual information, that further indicates or explains why the required operation(s) were not or could not be successfully completed.

At block 212, examples of method 200 include transmitting the reply massage generated at block 210 to a host over the network fabric using NVMe-oF formatted communications. In various examples, at least some portion of the network fabric used to transmit the NVMe-oF formatted reply message is a same portion of the network fabric used to transmit the message received at the storage device.

Figure 2B:
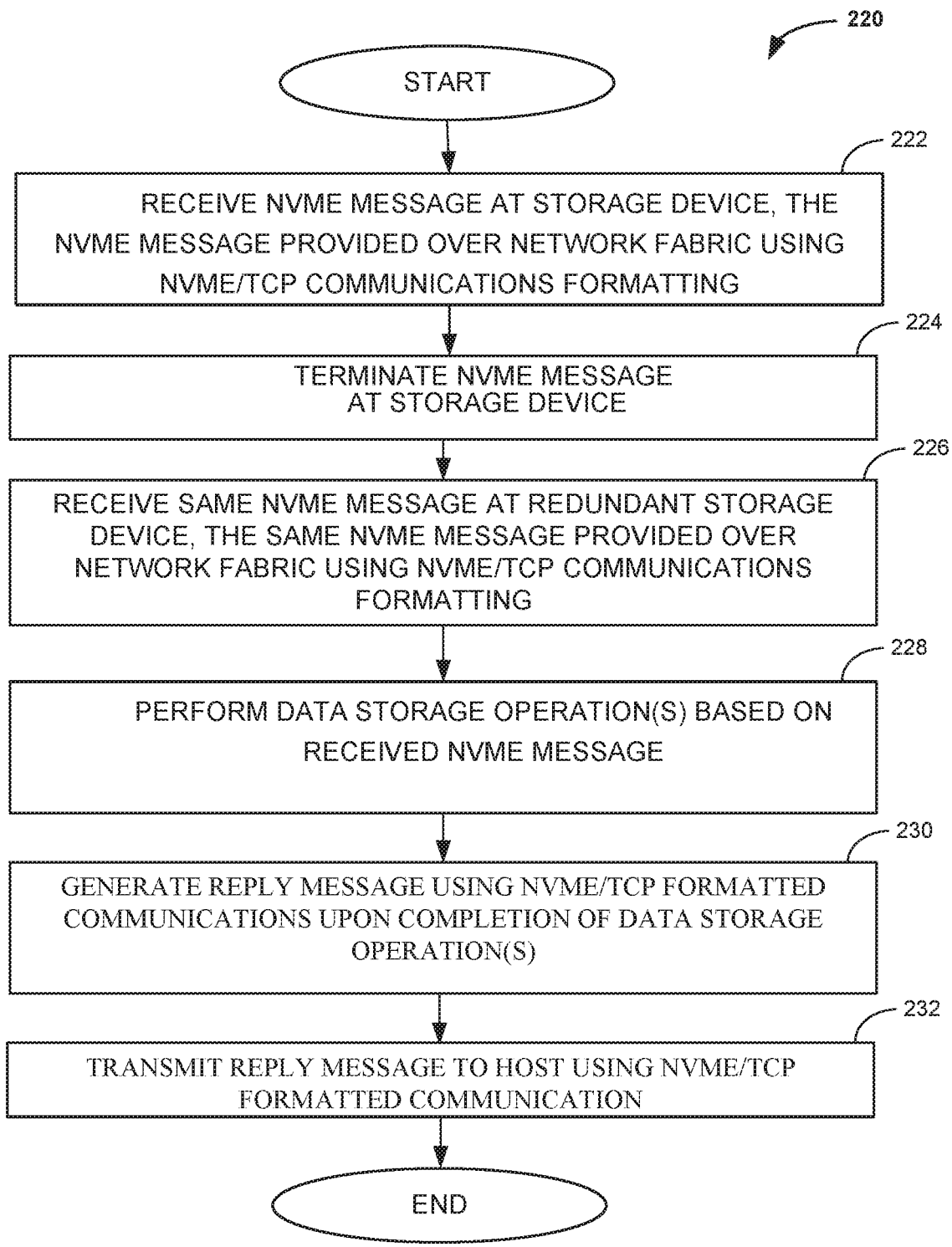
FIG. 2B is a flowchart of another method for terminating non-volatile memory networking messages at the drive level.

FIG. 2B is a flowchart of another method 220 for terminating non-volatile memory networking messages at the drive level. Method 220 comprises various functions associated one or more storage devices, such as SSDs, which are configured as NVMe/TCP compatible devices and further configured to terminate at the drive level any NVMe/TCP formatted messages directed to the storage devices. The storage devices may further be configured to generate and issue one or more reply messages directed to the host and regarding a status provided in response to received messages, where the reply messages may also be generated and issued using NVMe/TCP formatting.

At block 222, examples of method 220 include receiving, at a storage device, a message issued by a host for data storage services to be provided by the storage device, the message provided over a network fabric using NVMe/TCP as the transport layer for the communication formatting of the message. In various examples, the storage device is a solid-state drive (SSD) device. In various examples, the storage device is a hard-disc drive (HDD). In various examples, the storage device is a hybrid SSD/HDD. In various examples, the network fabric comprises TCP compatible interconnections coupling the devices of the network fabric.

At block 224, examples of method 220 include terminating the NVMe/TCP formatted communication including the message at the storage device. In various examples, terminating the NVMe/TCP formatted communication includes terminating the communication at a local processor or at a local interface of the storage device. In various examples, the local processor and a memory array of the storage device are provided on a same integrated circuitry or circuitry.

At block 226, examples of method 220 include receiving, at a redundant storage device, the message that was directed to and received by the storage device as the same message, the same message provided over the network fabric using NVMe/TCP communications formatting. In various examples the redundant storage device is a solid-state drive (SSD) device. In various examples, the redundant storage device is a hard-drive device (HDD). In various example, the storage device is a hybrid SSD/HDD. In various examples, the redundant storage device is a same type of device (e.g., a SSD) as the storage device receiving the message at block 222 of method 220. In various examples, the redundant storage device is a different type of device (e.g. a SSD versus a HDD) relative to the storage device receiving the message at block 222 of method 220.

At block 228, examples of method 220 include performing one or more data storage operations based on the received message. Performing one or more data storage operations may include reading data stored in a memory array of the storage device, writing data to the memory array of the storage device, erasing data stored in the storage device, some combination of these operations, and/or other operations that relate to data stored at the storage device, and/or the operational status of the storage device. For example, a message may be received including a request to provide information related to the overall and/or the remaining data storage capacity present in the storage device, and/or a request for reporting performance information with respect to latency or other performance parameters associated with the operation of the storage device receiving the message.

Performing data storage operations in some examples may include setting memory locations or flags in a request queue of the storage device to indicate that the one or more operations requested as a result of receiving the message at the storage device have been received, and setting memory locations or flags in a completion queue of the storage device to indicate that the one or more operations requested as part of receiving the message have been completed. In various examples, one or more memory locations or flags within the storage device may be set when for any reason the operation(s) being requested by the message cannot be completed in full and/or in part (e.g., by setting one or more error codes associated with the required data storage operation associated with the message).

At block 230, examples of method 220 include generating a reply message using NVMe/TCP formatted communications upon completion of the one or more data storage operations associated with the received message. In various examples, the reply message may include data that was requested to be read from the data array of the storage device that received the message. In various examples, the reply message may include information or other indications that indicate that the data storage operation(s) requested by the received message have been successfully completed. In various examples, the reply message may include information or other indications, such as flag settings, indicating that the data storage operation requested by the received message was not successfully completed. A reply message indicating unsuccessful completion of a requested data storage service may further include data, such as one or more error codes, or textual information, that further indicates or explains why the required operation(s) were not or could not be successfully completed.

At block 232, examples of method 220 include transmitting the reply massage generated at block 230 to a host over the network fabric using NVMe/TCP formatted communications. In various examples, at least some portion of the network fabric used to transmit the NVMe/TCP formatted reply message is a same portion of the network fabric used to transmit the message received at the storage device.

Example Apparatus

Figure 3:
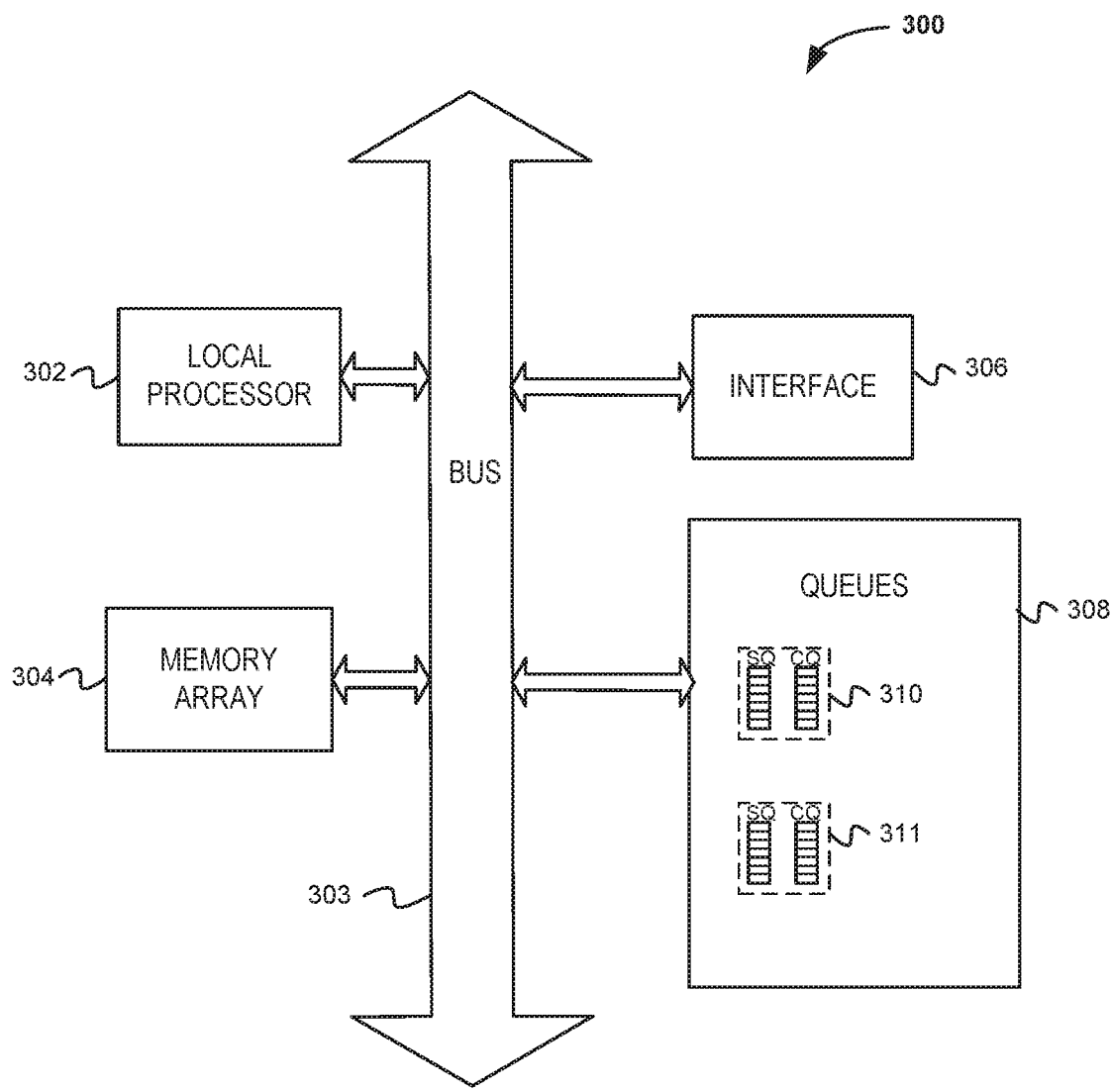
FIG. 3 is a simplified example block diagram of storage device that may be configured to terminate non-volatile memory networking messages at the drive level.

FIG. 3 is a simplified example block diagram of solid-state drive 300 that may be configured according to various examples as described throughout this disclosure, and any equivalents thereof. Examples of solid-state drive (SSD) 300 may include a local processor 302, a memory array 304, an interface 306, and one or more sets of queues 308. A bus 303 may be coupled to the various elements included in SSD 300, and be configured to communicatively couple these elements. Examples of SSD 300 may be any one or more of storage devices 136A-136X as illustrated and described with respect to FIG. 1, and may be configured to perform some or all of the functions described with respect to method 200 (FIG. 2) and any equivalents thereof.

Examples of local processor 302 may include multiple processors, multiple cores, multiple nodes, and/or implementing multi-threading, etc.) that coordinates operations on the SSD 300. Examples of memory array 304 are not limited to any particular type of memory, and may be system memory (e.g., one or more of cache, random access memory (RAM), synchronous RAM (SRAM), dynamic RAM (DRAM), zero capacitor RAM, Twin Transistor RAM, embedded DRAM (eDRAM), extended data output RAM (EDO RAM), double data rate RAM (DDR RAM), electrically erasable programmable read only memory (EEPROM), Nano-RAM (NRAM), resistive RAM (RRAM), silicon-oxide-nitride-oxide-silicon memory (SONOS), parameter random access memory (PRAM), etc.) or any one or more other possible realizations of non-transitory machine-readable media/medium.

Examples of interface 306 are not limited to any particular type of interface, and may include one or more interface devices or modules controllable by local processor 302 to provide communications between SSD 300 and one or more other devices, such as host 101 (FIG. 1) over a network fabric, using any of the methods and/or techniques described throughout this disclosure, and any equivalents thereof. For example, interface 306 configured to receive and to terminate incoming messages that have been transmitted to the interface over a network fabric using NVMe-oF communications formatting. The interface may be configured to receive a message having NVMe-oF formatting, and terminate the communication including the message at the interface. In other examples, interface 306 configured to receive and to terminate incoming messages that have been transmitted to the interface over a network fabric using NVMe/TCP communications formatting. The interface may be configured to receive a message having NVMe/TCP formatting, and terminate the communication including the message at the interface.

The message portion of the terminated NVMe-oF or NVMe/TCP formatted communication received by interface 306 may be passed along to local processor 302 for further processing and operations based on the content of the message. In addition, upon completion of the processes indicated by the command portion of the incoming message, local processor 302 may be configured to generate a reply message. The reply message may include information as described above related to the completion or non-completion of a data storage operation, for example data retrieved from memory array 304, and/or other information related to the operation(s) performed by local processor 302 in response to the command. The local processor 302 may generate or control interface 306 to generate, the reply message in a NVMe-oF or NVMe/TCP compatible communications format, wherein the interface 306 is configured to transmit the NVMe-oF or NVMe/TCP formatted communication over a network fabric and directed to the host that originated the command. The reply message may be transmitted over a corresponding NVMe-oF or NVMe/TCP compatible network fabric, such as ethernet, or a TCP compatible network fabric, along the entire route between SSD 300 and the targeted host without the need to terminate the reply message until the reply message reaches the targeted host.

Bus 303 is not limited to any particular type of bus, and may for example be compliant with Peripheral Component Interconnect (PCI), Industry Standard Architecture (ISA), PCI-Express, New Bus (NuBus), Advanced Extensible Bus AXI Bus, and Ethernet standards. Bus 303 may also facilitate communications between local processor 302 and the memory array 304 and queues 308. In various examples, queues 308 includes a pair of queues 310 including a submission queue (SQ) and a completion queue (CQ). The submission queue of queues 310 may be configured to allocate memory spaces for storing statuses and commands related to receipt of incoming commands, and the completion queue of queues 310 may be configured to allocate memory spaces for storing statuses related to the completion of operations requested by incoming commands received at SSD 300. Queues 308 is not limited to having one set of submission/completion queues, and may have one or more additional sets of queues, as illustrative represented by queues 311. In various examples, individual sets of queues included in queues 308 may be reserved for storing status information related to commands received from a respective particular host device, such as host 101 of FIG. 1.

These functions ascribed to SSD 300 may be implemented in a combination of hardware and/or software (e.g., computer code, program instructions, program code, computer instructions) stored on a non-transitory machine readable medium/media. In some instances, the local processor 302 and memory array 304 may implement or facilitate implementing the functionalities instead of or in addition to a management processor module, data processor module, and/or a command processor module. Further, examples of SSD 300 may include fewer or additional components not illustrated in FIG. 3 (e.g., video cards, audio cards, additional network interfaces, peripheral devices, etc.).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

What is claimed is:
1. A method, comprising:
receiving, at a first storage device, a message requesting data storage services to be provided by the first storage device, the message provided over a network interconnection and being formatted according to a Non-Volatile Memory Express (NVMe) over Fabric (NVMe-oF) protocol; and
terminating, at the first storage device, the message formatted according to the NVMe-oF protocol;

receiving, at a redundant second storage device, a replica of the message formatted according to the NVMe-oF protocol; and terminating, at the redundant second storage device, the replica of the message formatted according to the NVMe-oF protocol.

2. The method of claim 1, wherein receiving the message at the first storage device comprises receiving the message at a first solid-state drive; and wherein receiving the replica of the message at the redundant second storage device comprises receiving the message at one of i) a second solid-state drive, and ii) a hard disk drive.

3. The method of claim 1, wherein receiving the message at the first storage device comprises receiving the message according to an ethernet transport layer protocol.

4. The method of claim 1, wherein receiving the message at the first storage device comprises receiving the message according to an RoCEv2 transport layer protocol.

5. The method of claim 1, wherein receiving the message at the first storage device comprises receiving the message according to an Infiniband communication protocol.

6. The method of claim 1, wherein terminating the message formatted according to the NVMe-oF protocol at the first storage device comprises terminating the message at a local processor of the first storage device.

7. The method of claim 1, further comprising:
issuing a reply message from the first storage device to a host processor upon completion of the requested data storage services, the reply message being formatted at the first storage device according to the NVMe-oF protocol.

8. The method of claim 7, wherein in the reply message includes an indication of completion of a request for the data storage services issued to the first storage device by a host.

9. The method of claim 7, wherein the reply message incudes data retrieved from the first storage device at the request of a host.

10. A method, comprising:
receiving, at a first storage device, a message requesting data storage services to be provided by the first storage device, the message provided over a network interconnection and being formatted according to a Non-Volatile Memory Express over Transmission Control Protocol protocol;

terminating, at the first storage device, the message formatted according to the NVMe/TCP protocol;

receiving, at a redundant second storage device, the replica of the message formatted acceding to the NVMe/TCP protocol; and terminating, at the redundant second storage device, the replica of the message formatted according to the NVMe/TCP protocol.

11. The method of claim 10, wherein receiving the message at the first storage device comprises receiving the message at a first solid-state drive; and wherein receiving the replica of the message at the redundant second storage device comprises receiving the replica of the message at one of i) a second solid-state drive, and ii) a hard disk drive.

12. The method of claim 10, wherein terminating the message having formatted according to the NVMe/TCP protocol comprises terminating the message at a local processor of the storage device.

13. The method of claim 10, wherein receiving the message at the first storage device comprises receiving the message from a network fabric according to a Transmission Control Protocol (TCP) transport layer protocol.

14. The method of claim 10, further comprising:
issuing a reply message from the first storage device to a host processor upon completion of the requested data storage services, the reply message being formatted at the first storage device according to the NVMe/TCP protocol.

15. The method of claim 14, wherein the reply message includes an indication of completion of a request for the data storage services issued to the first storage device by a host.

16. A storage system, comprising:
a first storage device comprising a first local processor and a first memory array,
wherein the first memory array is configured to store persistent digitally encoded data on non-volatile memory, and
wherein the first local processor is configured to terminate messages formatted according to a Non-Volatile Memory Express over Fabric (NVMe-oF) protocol or a NVMe/Transmission Control Protocol (NVMe/TCP) protocol at the first local processor, the messages having been issued by a host processor and communicated over a network fabric; and
a second storage device comprising a second local processor and a second memory array,
wherein the second memory array is configured to store persistent digitally encoded data on non-volatile memory, and
wherein the second local processor is configured to terminate, at the second local processor, replicas of the messages that are terminated at the first local processor of the first storage device.

17. The storage system of claim 16, wherein:
the first storage device is a solid-state drive.

18. The storage system of claim 16, wherein the network fabric is configured to use RoCEv2 or TCP as a transport layer for communicating the messages that are formatted according to the NVMe-oF protocol or the NVMe/TCP protocol.

19. The storage system of claim 16, wherein the network fabric is configured to operate according to an Infiniband transport layer protocol.

* * * * *